(12) United States Patent
Vengerov et al.

(10) Patent No.: US 8,533,026 B2
(45) Date of Patent: Sep. 10, 2013

(54) METHOD AND SYSTEM FOR MAXIMIZING REVENUE GENERATED FROM SERVICE LEVEL AGREEMENTS

(75) Inventors: David Vengerov, Sunnyvale, CA (US); Ilya Gluhovsky, Daly City, CA (US)

(73) Assignee: Oracle America, Inc., Redwood City, CA (US)

( * ) Notice: Subject to any disclaimer, the term of this patent is extended or adjusted under 35 U.S.C. 154(b) by 1453 days.

(21) Appl. No.: 11/581,939

(22) Filed: Oct. 17, 2006

(65) Prior Publication Data

US 2008/0091446 A1 Apr. 17, 2008

(51) Int. Cl.
G06Q 10/00 (2012.01)

(52) U.S. Cl.
USPC .......... 705/7.37; 705/7.11; 705/7.38

(58) Field of Classification Search
USPC ................ 705/7, 7.11, 7.37, 7.38
See application file for complete search history.

(56) References Cited

U.S. PATENT DOCUMENTS

| | | | | |
|---|---|---|---|---|
| 2002/0112060 | A1* | 8/2002 | Kato | 709/227 |
| 2002/0198995 | A1* | 12/2002 | Liu et al. | 709/226 |
| 2003/0149603 | A1* | 8/2003 | Ferguson et al. | 705/7 |
| 2005/0010456 | A1* | 1/2005 | Chang et al. | 705/7 |
| 2005/0283376 | A1* | 12/2005 | Miyoshi et al. | 705/1 |
| 2006/0026010 | A1* | 2/2006 | van Moorsel et al. | 705/1 |
| 2006/0106637 | A1* | 5/2006 | Johnson et al. | 705/1 |
| 2006/0277307 | A1* | 12/2006 | Bernardin et al. | 709/226 |
| 2007/0011052 | A1* | 1/2007 | Liu et al. | 705/20 |
| 2008/0091446 | A1* | 4/2008 | Vengerov et al. | 705/1 |
| 2008/0235160 | A1* | 9/2008 | Liu et al. | 705/400 |

OTHER PUBLICATIONS

On Admission Control for Profit Maximising of Networked Service Providers: WWW2003, May 20-24, 2002, Budapest, Hungary. ACM 1-58113-680-3/03/0005. Akshat Verma and Sugata Ghosal, IBM India Research Laboratory, India Institute of Technology.*
SLA Based Profit Optimization in Autonomic Computing systems by Li Zhang and Danilo Ardagna 2004 ACM.*
Vengerov, D. et al.; "A Fuzzy Reinforcement Learning Approach to Power Control in Wireless Transmitters"; IEEE Transactions on Systems, Man, and Cybernetics B, vol. 35, Issue 4, Aug. 2005; 11 pages.
Mosse, D. et al.; "Value-Density Algorithms to Handle Transient Overloads in Scheduling"; Proceedings of the 11th Euromicro Conference on Real-Time Systems; Jun. 1999; 10 pages.
Tsitsiklis, J. N.; "An Analysis of Temporal-Difference Learning with Function Approximation"; IEEE Transactions on Automatic Control; May 1997; vol. 42, No. 5; pp. 674-690; 17 pages.

(Continued)

Primary Examiner — Andre Boyce
Assistant Examiner — Ernest A Jackson
(74) Attorney, Agent, or Firm — Osha Liang LLP

(57) ABSTRACT

A method for maximizing revenue generated from a plurality of service level agreements (SLAs) that includes receiving a first subset of the plurality of SLAs for executing a first plurality of jobs, wherein each SLA in the first subset specifies a first maximum requested delay that is greater than an initial minimum offered delay, and wherein a price of each SLA in the first subset is defined by the maximum requested delay and a price/delay function, calculating a first expected revenue from executing the first subset, and optimizing a second subset of the plurality of SLAs by replacing the initial minimum offered delay on the initial price/delay function with a new minimum offered delay based on the expected revenue, wherein each SLA in the second subset specifies a second maximum requested delay that is greater than the new minimum offered delay.

16 Claims, 5 Drawing Sheets

(56) References Cited

OTHER PUBLICATIONS

Lu, C. et al.; "Feedback Control Real-Time Scheduling: Framework, Modeling, and Algorithms"; Journal of Real-Time Systems, Kluwer Academic Publishers, vol. 23, No. 1, Jul. 2002; pp. 85-126; 42 pages.
Wang, L.; "Fuzzy Systems Are Universal Approximators"; Proceedings of the IEEE International Conference on Fuzzy Systems (FUZZ-IEEE '92); 1992; pp. 1163-1170; 8 pages.
Liu, C.L. et al.; "Scheduling Algorithms for Multiprogramming in a Hard-Real-Time Environment"; Journal of ACM, vol. 20, No. 1, 1973; pp. 46-61; 16 pages.
Jaakkola, T. et al.; "On the Convergence of Stochastic Iterative Dynamic Programming Algorithms"; Neural Computation; vol. 6, No. 6, 1994; pp. 1185-1201; 32 pages.
Abounadi, J. et al.; "Learning Algorithms for Markov Decision Processes with Average Cost"; SIAM Journal on Control and Optimization; vol. 40, 2001; pp. 681-698; 18 pages.
Konda, V.R. et al.; "On Actor-Critic Algorithms"; SIAM Journal on Control and Optimization; vol. 42, No. 4, 2003, pp. 1143-1166; 24 pages.
Li, P. ; "Utility Accrual Real-Time Scheduling: Models and Algorithms"; Ph.D. Dissertation, Department of Electrical and Computer Engineering, Virginia Polytechnic Institute and State University, 2004; 130 pages.
Jensen, E.D. et al.; "A Time-Driven Scheduling Model for Real-Time Operating Systems"; Proceedings IEEE Real-Time Systems Symposium; 1985; pp. 112-122; 11 pages.
Tsitsiklis, J.N. et al.; "Average Cost Temporal-Difference Learning"; Proceedings of the 36$^{th}$ Conference of Decision & Control, Dec. 1997; pp. 498-502; 5 pages.
Kepner, J.; "HPC Producticity: An Overarching View"; International Journal of High Performance Computing Applications: Special Issue on HPC Productivity; Nov. 2004; vol. 18, No. 4; 6 pages.
Kepner, J.; "High Performance Computing Productivity Model Synthesis"; International Journal of High Performance Computing Applications: Special Issue on HPC Productivity; Nov. 2004; vol. 18, No. 4; 13 pages.
Wong, A.T. et al.; "ESP: A System Utilization Benchmark"; Proceedings of Supercomputing 2000 (SC2000) Conference; 12 pages.
Vengerov, D.; "A Reinforcement Learning Framework for Utility-Based Scheduling in Resource-Constrained Systems"; SMLI TR-2005-141, Feb. 2005; 16 pages.
Wu, H. et al.; "Utility Accrual Scheduling Under Arbitrary Time/Utility Functions and Mult-Unit Resource Constraints"; IEEE Real-Time and Embedded Computing Systems and Applications, Aug. 2004; pp. 80-98; 20 pages.
Li, P. et al.; "A Utility Accrual Scheduling Algorithm for Real-Time Activities With Mutual Exclusion Resource Constraints"; The MITRE Corporation Working Paper, Apr. 2004; pp. 454-469; 39 pages.
Kaelbling, L. P. et al.; "Planning and Acting in Partially Observable Stochastic Domains"; Artificial Intelligence, vol. 101, No. 1-2, 1998; pp. 99-134; 42 pages.
Kaelbling, L.P. et al.; "Reinforcement Learning: A Survey"; Journal of Artificial Intelligence Research, vol. 4, 1996, pp. 237-285; 49 pages.
Jensen, E.D.; "Alpha: A Non-Proprietary OS for Large, Complex, Distributed Real-Time Systems"; Proceedings of IEEE Workshop on Experimental Distributed Systems; 1990, pp. 35-41; 7 pages.

* cited by examiner

METHOD AND SYSTEM FOR MAXIMIZING REVENUE GENERATED FROM SERVICE LEVEL AGREEMENTS

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

The typical distributed computer system includes multiple interconnected nodes, connection devices, and a connection medium. One common example of a distributed computer system is the Internet. Through the Internet, nodes in one region of the world are able to communicate with nodes in a different region.

The interconnection of nodes in a distributed computer system provides a mechanism for a client to use the processing power and environment that is not available locally. Specifically, a client can submit a job to a collection of processors that are remotely located. A job is a request for the collection of processors to process instructions.

For example, consider the example of forecasting weather patterns. In order to forecast weather patterns, meteorological researchers may create weather modeling programs on a local computer. Typically, the researcher also collects data from satellites, electronic data collection stations, planes, etc. Using the collected data, the researcher populates a series of data files on a local computer. Once the data files are populated, the researcher may access the Internet through a web browser, or access an ftp server. Using the web browser or ftp server, the researcher sends the weather modeling program and the series of data files to a collection of processors. The researcher then requests that the weather modeling program is executed by clicking the submit button or typing the correct command. After the execution of the program by the remote collection of processors, the researcher may obtain the results by copying a file that contains the results to the local computer and opening the file.

Processing a job typically requires payment from the client. Specifically, each job typically has a price associated with the job. In order to submit the job, the client must pay or promise to pay the price. The price may be set, for example, as a constant. Specifically, regardless of the promised performance characteristics for executing the job, the price of executing the job may be solely dependent on the amount of time to execute the job.

Returning to the above weather pattern example, the constant price may be set as five dollars per hour per processor. Accordingly, if the weather forecasting job requires six processors executing for eight hours, then the cost is two hundred and forty dollars. After calculating the potential cost, the researcher may decide whether to pay the price to execute the job remotely.

SUMMARY

In general, in one aspect, the invention relates to a method for maximizing revenue generated from a plurality of service level agreements (SLAs) that includes receiving a first subset of the plurality of SLAs for executing a first plurality of jobs, wherein each SLA in the first subset specifies a first maximum requested delay that is greater than an initial minimum offered delay, and wherein a price of each SLA in the first subset is defined by the maximum requested delay and a price/delay function, calculating a first expected revenue from executing the first subset, and optimizing a second subset of the plurality of SLAs by replacing the initial minimum offered delay on the initial price/delay function with a new minimum offered delay based on the expected revenue, wherein each SLA in the second subset specifies a second maximum requested delay that is greater than the new minimum offered delay.

In general, in one aspect, the invention relates to a system for maximizing revenue generated from a plurality of service level agreements (SLAs) that includes a scheduler configured to receive a first subset of the plurality of SLAs for executing a first plurality of jobs, wherein each SLA in the first subset specifies a first maximum requested delay that is greater than an initial minimum offered delay, and wherein a price of each SLA in the first subset is defined by the maximum requested delay and a price/delay function, and an evaluator configured to calculate a first expected revenue from executing the first subset, and optimize a second subset of the plurality of SLAs by replacing the initial minimum offered delay on the initial price/delay function with a new minimum offered delay based on the expected revenue, wherein each SLA in the second subset specifies a second maximum requested delay that is greater than the new minimum offered delay.

In general, in one aspect, the invention relates to a computer readable medium that includes instructions embodied therein for causing a computer system to receive a first subset of a plurality of SLAs for executing a first plurality of jobs, wherein each SLA in the first subset specifies a first maximum requested delay that is greater than an initial minimum offered delay, and wherein a price of each SLA in the first subset is defined by the maximum requested delay and a price/delay function, calculate a first expected revenue from executing the first subset, and optimize a second subset of the plurality of SLAs by replacing the initial minimum offered delay on the initial price/delay function with a new minimum offered delay based on the expected revenue, wherein each SLA in the second subset specifies a second maximum requested delay that is greater than the new minimum offered delay.

Other aspects of the invention will be apparent from the following description and the appended claims.

DETAILED DESCRIPTION

Figure 1:
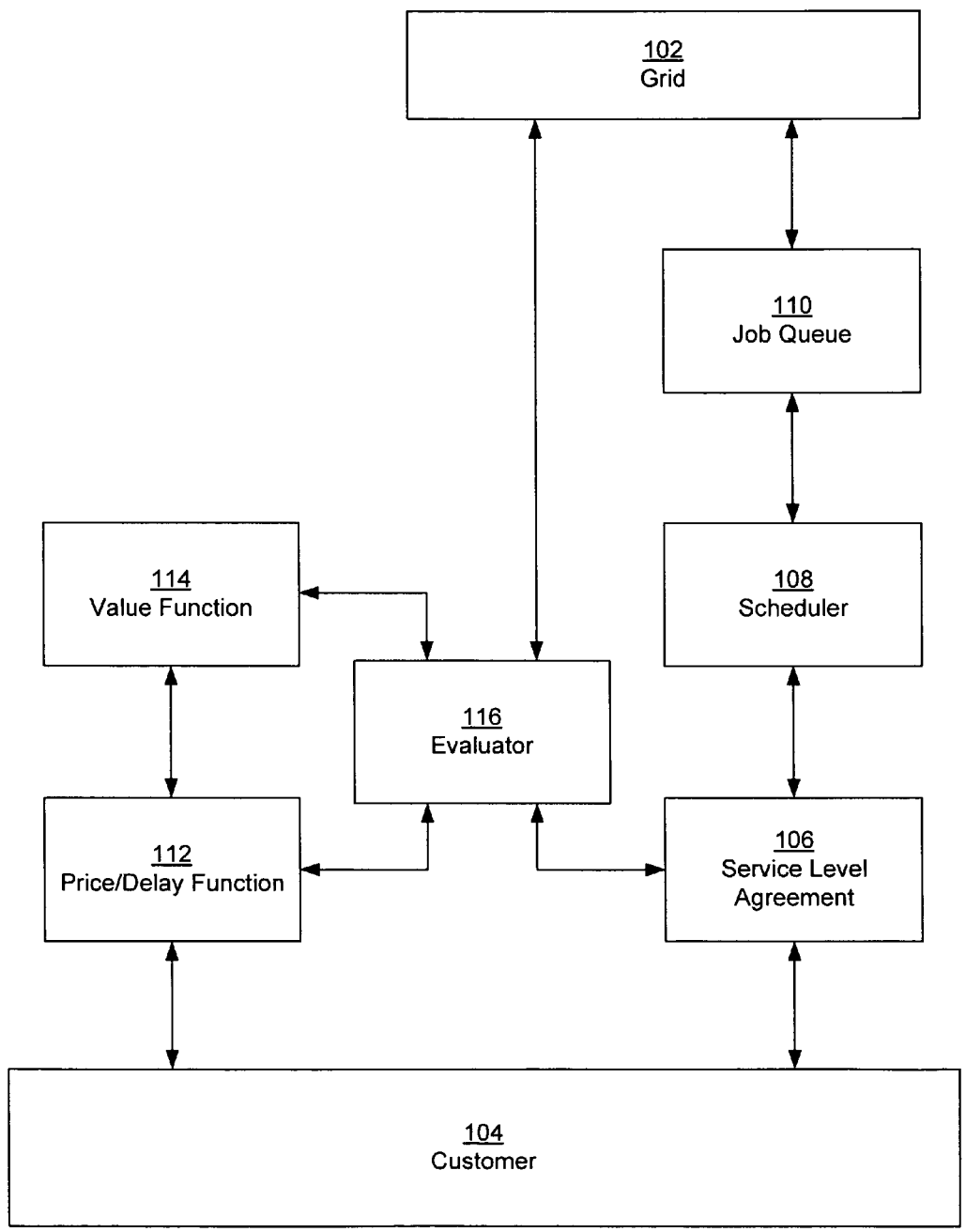
FIG. 1 shows a schematic diagram of a system for maximizing revenue generated from service level agreements in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for maximizing revenue generated from service level agreements. A service level agreement specifies the maximum amount of delay when processing a job for a given price. Each service level agreement is defined using a price/delay function. The price/delay function correlates a price with a maximum amount of delay. Thus, a customer may choose any service level agreement and pay the price denoted by the price/delay function. Further, the price/delay function may be optimized based on the current state of the system to maximize revenue.

FIG. 1 shows a schematic diagram of a system for maximizing revenue generated from service level agreements in accordance with one or more embodiments of the invention. As shown in FIG. 1, the system includes a grid (102), a customer (104), a service level agreement (106), a scheduler (108), a job queue (110), an evaluator (116), a price/delay function (112), and a value function (114). Each of these components is described below.

In one or more embodiments of the invention, the grid (102) corresponds to any type of collection of processors, such as a shared memory multi-processor system, a distributed memory computer system, a Supercomputer, a cluster of computer systems, or any other such collection of processors or combination thereof. Further, the collection of processors in the grid (102) may be physically located together (e.g., in the same box unit, in the same room, etc.) or physically dispersed (e.g., different buildings, cities, across the world, etc.).

The grid (102) includes functionality to execute a job. Specifically, one or more processors in the grid execute the job. A job corresponds to a unit of work that requires processing. For example, a job may correspond to a request to execute an application, a request to perform an action external to the computer system, or any other request that requires processing. Further, the job may include executable files, data files, etc. that require processing. An attribute of a job is the job state (e.g., ready, waiting, completed, terminated). The job state identifies the position of the job while the job is executing.

Continuing with FIG. 1, a customer (104) includes functionality to generate a job. Specifically, a customer (104) corresponds to any type of entity that may submit a job for execution by the engine. For example, a customer (104) may correspond to an individual, a business entity, a computer system, etc. Moreover, a customer (104) includes functionality to create a service level agreement (106).

A service level agreement (106) corresponds to a contract between the customer (104) and a business entity (not shown) that manages the grid (102). Specifically, the service level agreement may specify a maximum amount of delay that the grid (102) will have when executing the job and the price that the customer (104) will pay for executing the job within the maximum amount of delay. The service level agreement (106) may also specify a penalty (not shown) that the business entity will pay for having a delay greater than the maximum amount.

The penalty corresponds to a monetary amount, a voucher to execute another job, or any other form of compensation for not complying with the service level agreement. Typically, the penalty has an associated cost to the business entity. For example, the associated cost may correspond to the cost of the monetary amount, the cost of the voucher, the processing costs, and the cost in the loss of revenue if a customer does not return.

As an alternative to the service level agreement (106) specified for a single job, the service level agreement may be created for a collection of jobs, for the customer, etc. For example, the service level agreement may specify that for a specific timeframe (e.g., daily, yearly, monthly, etc.), any number of jobs may be submitted with the same maximum requested delay within the timeframe and for a single price.

A scheduler (108) is connected to the service level agreements (106). A scheduler (108) corresponds to business logic that includes functionality to schedule a job based on the service level agreement (106). Specifically, the scheduler (108) includes functionality to identify the maximum requested delay specified in the service level agreement and schedule the job accordingly. The scheduler (108) is connected to a job queue (110).

A job queue (110) corresponds to a waiting area for jobs. In one or more embodiments of the invention, the job queue (110) is ordered according to the remaining time in the maximum requested delay. The job queue (110) may also be ordered to account for the cost associated with the penalty required if the maximum requested delay is exceeded and/or to account for the customer that submits the job.

For example, if the service level agreement for job X specifies maximum requested delay of one hour and a penalty of twenty-four dollars for every hour thereafter, then job X may be schedule before job Z, that has a service level agreement specifying a maximum requested delay of forty-five minutes with a penalty of three dollars for each hour thereafter. In the example, even though the job Z has a maximum requested delay less than job X, the cost of the penalty for job X is twenty-one dollars more expensive per hour. Thus, the actual delay exceeding the maximum requested delay of job Z is less costly than the actual delay exceeding the maximum requested delay of job X.

Further, a single job queue (110) may exist for the entire grid (102) or a portion of the grid (102). Specifically, multiple processors in the grid (102) may obtain jobs from the job queue (110), such as through a greedy approach in which as a processor completes a job, the processor obtains another job from the job queue. Alternatively, each processor in the grid may have a separate job queue (110). The jobs in the processor's job queue (110) are assigned to the processor. A job that requires multiple processors may be assigned to a particular processor which acts as a master for coordinating execution of the job.

Continuing with FIG. 1, the system also includes a price/delay function (112). The price/delay function (112) corresponds to a function that correlates the price with the maximum requested delay. In one or more embodiments of the invention, the shape of the price/delay function corresponds to a convex decreasing curve. Specifically, if drawn on a two dimensional graph, the shape of is convex decreasing curve. For example, the price/delay function (112) may correspond to a function of the form: "$P(t)=A*e^{-b*t}$," in which P(t) is the price, A and b are constants, t is the maximum requested delay time, and e is the natural exponential function.

Further, the price/delay function may or may not be continuous. For example, the price/delay function may specify prices discretely on an incremental basis, such as at ten minute intervals for the maximum requested delay. In one or more embodiments of the invention, the price/delay function (112) has a minimum offered delay. The minimum offered delay corresponds to the minimum time that a customer may set as the maximum requested delay. Specifically, the minimum offered delay specifies that no matter the price, the customer cannot purchase a service level agreement that specifies a maximum requested delay that is less than the minimum offered delay.

The price/delay function (112) is connected to a value function (114) in accordance with one or more embodiments of the invention. The value function (114) corresponds to a function that estimates future revenue generated by a particular price/delay function (112). Input of the value function (114) corresponds to a state vector. The state vector corresponds to a set of state variables that may be used to describe the state of a processor. State variables in the state vector of the value function (114) may include the amount of stress on the grid to complete jobs within the maximum requested delay time, the shape of the price/delay function (112), an estimation for the number of customers for each price specified in the price/delay function (112), current expected delay for the highest priority job, the minimum offered delay for any customer, the current price charged for the minimum offered delay, etc. In one or more embodiments of the invention, the state vector of the value function (114) is learned using reinforcement learning. Specifically, which state variables are included in the state vector may be updated using reinforcement learning.

In one or more embodiments of the invention, the value function (114) is defined using fuzzy logic. Fuzzy logic uses a fuzzy rule base. Specifically, a fuzzy rule base defines how the value function is calculated. A fuzzy rule base includes rules that generate output given the values of the state variables of the value function (discussed above). Each rule may have a weight associated with the rule. By multiplying the weight by the output of the rule and summing the results for each rule, the value function estimates the revenue generated. Further, the rules and weights of the value function may be learned using reinforcement learning.

Continuing with FIG. 1, an evaluator (116) is connected to the value function (114), the price/delay function (112), and the service level agreement (106) in accordance with one or more embodiments of the invention. The evaluator (116) corresponds to business logic that includes functionality to optimize the revenue generated by the service level agreements. Specifically, the evaluator (116) includes functionality to evaluate the price/delay function (112) using the value function (114), the service level agreements, and the grid, and update the price/delay function. Moreover, the evaluator (116) includes functionality to change the minimum offered delay, modify the shape of the price/delay function (112) (e.g., by adjusting constants associated with the price/delay function (112)), update the value function (114), etc. in accordance with one or more embodiments of the invention. Before the service level agreements can be optimized, the price/delay function must be initialized.

Figure 2:
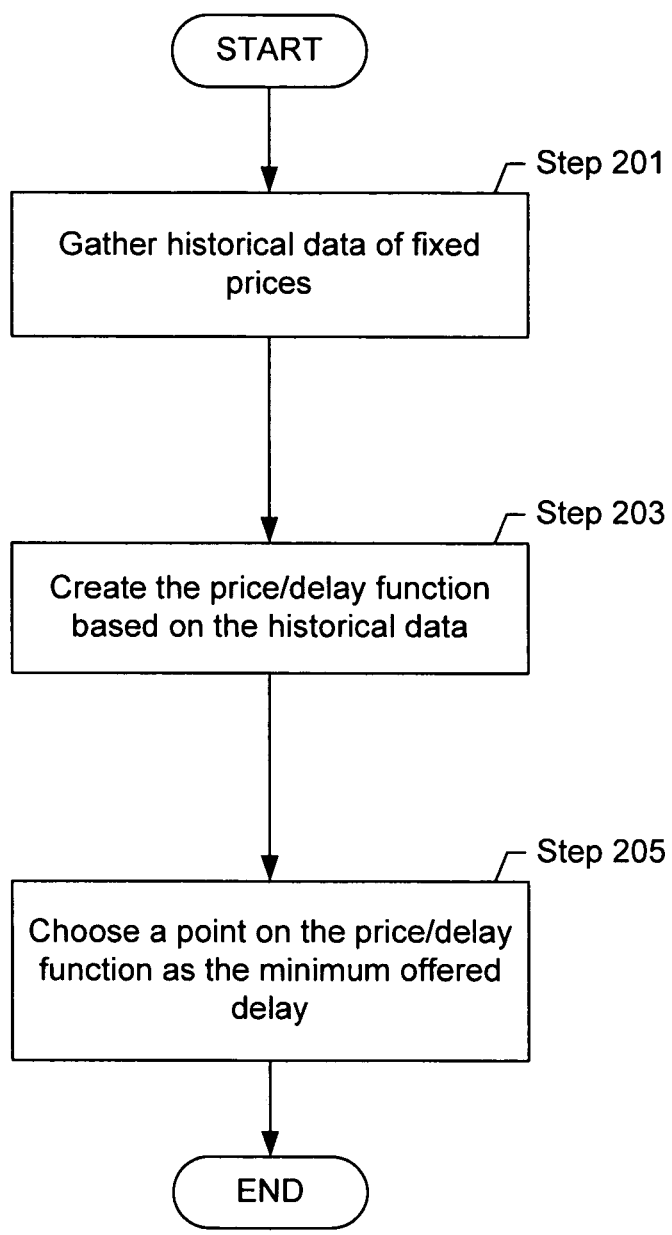
FIG. 2 shows a flowchart of a method for initializing a price/delay function used for service level agreements in accordance with one or more embodiments of the invention.

FIG. 2 shows a flowchart of a method for initializing a price/delay function used for service level agreements in accordance with one or more embodiments of the invention. Initially, historical data of fixed prices is gathered (Step 201). The historical data may originate from historical prices and amount of use of the grid. For example, the historical data may specify that at a price of twenty-four dollars per hour, twenty customers accepted a delay of thirty minutes. Alternatively, the historical data may be gathered from market research data.

Next, the price/delay function is created based on the historical data (Step 203). At this stage, the historical data is analyzed to determine the amount of stress the grid given different delays and the number of customers that the grid must service. Techniques in data mining, such as statistical analysis and linear regression may be employed to create the initial price/delay function.

Alternatively, rather than basing the price/delay function on historical data, the price/delay function may be set as an arbitrary curve. Specifically, because the price/delay function may be revised, the price/delay function may be set initially arbitrarily, such as to follow the form $P(t)=A*e^{-b*t}$.

Also, a value function may be created (not shown). Specifically, an initial state vector for the value function may be defined using the historical data. For example, a statistical analysis on the historical data may show a trend whereby customers are unwilling to pay more than seven dollars for a two hour maximum requested delay. Accordingly, a rule may be set that revenue is not generated for delays greater than two hours and for a price of more than seven dollars. In another example, the statistical analysis may show that the system will have a certain amount of stress if a specific price is offered. Accordingly, the value function may include the cost of penalty for not meeting the maximum requested delay because of the stress.

Continuing with FIG. 2, once the price/delay function is created, a point on the price/delay function is chosen as the minimum offered delay (Step 205). In one or more embodiments of the invention, the minimum offered delay is chosen in a manner that the majority of service level agreements are fulfilled by the grid (i.e., the grid may perform the jobs within the maximum requested delay stated in the respective service level agreements.) Accordingly, choosing the minimum offered delay may be performed using a statistical analysis of the historical data, setting the minimum offered delay arbitrarily, or performing any other method for choosing a minimum offered delay. Once the price/delay function and the minimum offered delay are created, service level agreements may be generated and processed.

Figure 3:
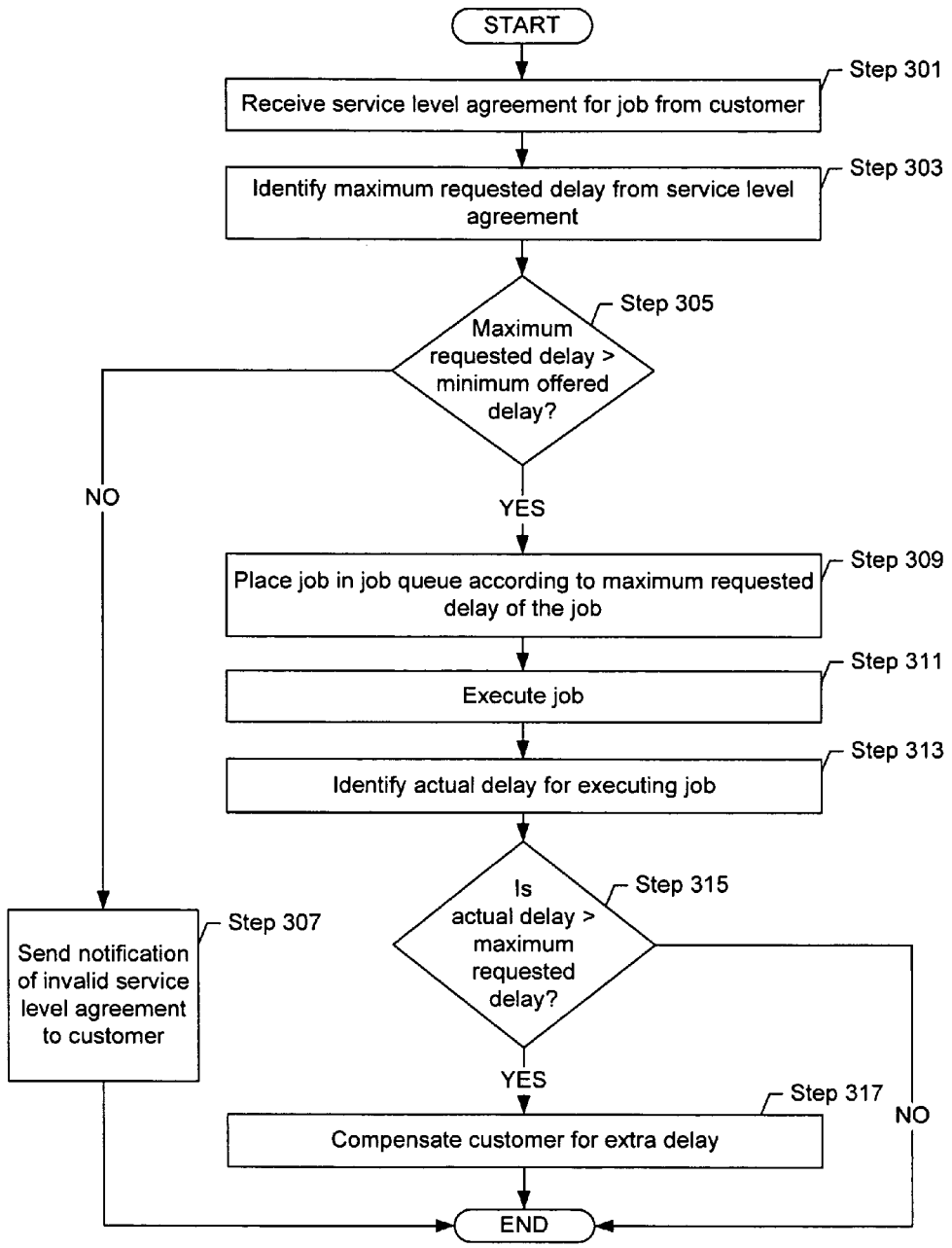
FIG. 3 shows a flowchart of a method for processing a service level agreement in accordance with one or more embodiments of the invention.

FIG. 3 shows a flowchart of a method for processing a service level agreement in accordance with one or more embodiments of the invention. Initially, a service level agreement for a job is received from a customer (Step 301). Specifically, the customer accesses the price/delay function and identifies the maximum amount of delay and the price and creates the service level agreement. In one or more embodiments of the invention, the customer may choose any maximum amount of delay that is greater than the minimum offered delay. Further, in one or more embodiments of the invention, a unique price exists for each maximum amount of delay that the customer may choose.

Accessing the price/delay function may be performed using any technique known in the art. Specifically, a customer may access a web application, access an account via an job submission application on the customer's computer, submit an order form, digitally or manually, for all jobs generated by the customer over a time period, etc. In addition, the customer may choose the price and/or maximum amount of delay by selecting either the price or the delay using the price/delay function, selecting the price or delay from a menu of optional prices or optional delays, or performing any other technique for choosing the price and delay.

Once the maximum amount of delay and the price is chosen, then the service level agreement is generated. Generating the service level agreement may include submitting billing information, agreeing on various stipulations (e.g., penalty, performance criteria, hardware and software configurations, etc.), and/or performing any other actions necessary to finalize the service level agreement. Alternatively, the service level agreement may correspond to a conventional agreement whereby each customer of the business entity must agree to the same stipulations defined by the business entity.

Continuing with FIG. 3, after the service level agreement is received from the customer, the maximum requested delay is identified from the service level agreement (Step 303). Also, at this stage, the stipulations of the service level agreement may be review to determine whether they are compatible with the resources of the grid.

Next, a determination is made whether the maximum requested delay is greater than the minimum offered delay (Step 305). In one or more embodiments of the invention, a customer may not be able to choose a maximum requested delay that is less than the minimum offered delay. Accordingly, if the maximum requested delay is less than the minimum offered delay, then a notification of an invalid service level agreement is sent to the customer (Step 307). Specifically, the customer is sent a notification that the service level agreement is not approved. The notification may be sent using any technique known in the art for communication of data.

Alternatively, if the maximum requested delay is greater than the minimum offered delay, then the job is placed in the job queue according to the maximum requested delay of the job (Step 309). Specifically, the job is placed in the job queue according to the amount of the maximum requested delay of the job and the remaining amount of maximum requested delay for jobs previously in the job queue.

For example, if a new job specifies ten minutes as the maximum requested delay, and a previous job in the job queue that has been waiting for fifteen minutes has a maximum requested delay of twenty minutes, then the previous job precedes the new job. Alternatively, if the previous job has only been waiting for five minutes of the twenty minutes than the new job precedes the previous job in the job queue.

Further, the customer and the amount of penalty may be accounted for when adding the job to the job queue. Specifically, the priority of the job in the job queue may not only account for the maximum requested delay, but also the amount of revenue originated by the customer and/or the cost of the penalty for not complying with the service level agreement. In addition, in one or more embodiments of the invention, the priority of jobs in the job queue may be dynamically updated. Specifically, when a determination is made that certain waiting jobs have an expected delay greater than the maximum requested delay, then the jobs in the job queue may be reprioritized according to the costs of the penalties that will be paid and/or the customer of the job.

When the job becomes the highest priority job and resources are available, the job is removed from the job queue and executed (Step 311). Specifically, when the job becomes the highest priority job and resources are available to execute the job, the job is executed. Once the job is executed, the actual delay is identified for executing the job (Step 313). The actual delay may be identified by the amount of time in which the job is in the job queue. Further, the actual delay may or may not include the time the job is being executed.

Next, a determination is made whether the actual delay is greater than the maximum requested delay (Step 315). Specifically, a determination is made whether the amount of actual delay complies with the service level agreement.

If the actual delay is greater than the maximum requested delay, the customer is compensated for the extra delay (Step 317). Specifically, a penalty corresponding to the amount of extra delay is transmitted to the customer according to the extra delay. The amount of the penalty may be consistent regardless of the amount of extra delay or may be based on the extra delay.

Regardless of whether the maximum requested delay is greater than the minimum offered delay, the customer is sent the results of the execution and the execution of the job is deemed completed in accordance with one or more embodiments of the invention. Based on the actual execution of the job, the price/delay function and the value function may be updated to maximize revenue.

Figure 4:
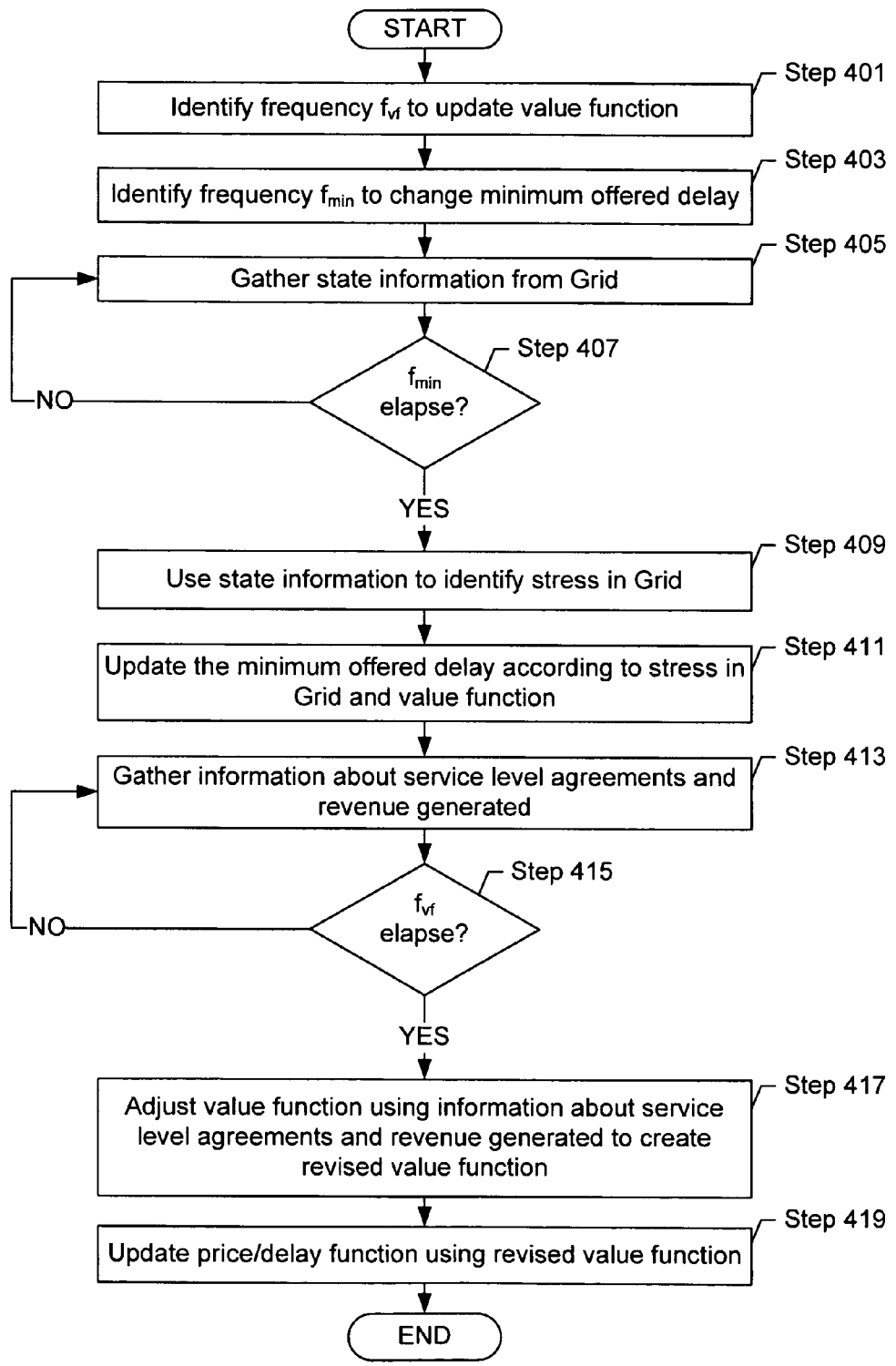
FIG. 4 shows a flowchart of a method for updating a price/delay function and a value function to maximize revenue generated from service level agreements in accordance with one or more embodiments of the invention.

FIG. 4 shows a flowchart of a method for updating a price/delay function and a value function to maximize revenue generated from service level agreements in accordance with one or more embodiments of the invention. Initially, a frequency (hereinafter referred to as "$f_{vf}$") to update the value function is identified (Step 401). In one or more embodiments of the invention, $f_{vf}$ is configurable. Specifically, a user or administrator associated with the business entity may define the $f_{vf}$. Defining the $f_{vf}$ may be performed, for example, during initialization of the system or redefined while the system is executing. Further, $f_{vf}$ may be defined as an elapse time, number of jobs processed, or using any other frequency parameter or combination thereof. Once $f_{vf}$ is defined, then $f_{vf}$ may be identified from the defined $f_{vf}$.

Also, a frequency (hereinafter referred to as "$f_{min}$") to update the minimum offered delay is identified (Step 403). Similar to $f_{vf}$, $f_{min}$ may also be defined in the configuration of the system and using any type of frequency parameter. Furthermore, in one or more embodiments of the invention, the $f_{min}$ is set at a higher frequency than $f_{vf}$. Specifically, the update to the minimum offered delay is performed more often than the update to the value function. Accordingly, identifying the $f_{min}$ may be performed by accessing the defined $f_{min}$.

Continuing with FIG. 4, while the Grid is executing, state information is gathered from the grid (Step 405). Gathering the state information may be performed by accessing performance information stored on each of the processors of the grid, obtaining the information from the scheduler, executing a thread on the processors that is dedicated to gathering state information, or performing any other technique known in the art.

Next, a determination is made whether $f_{min}$ has elapsed (Step 407). Specifically, a determination is made whether the timeframe or number of jobs defined by $f_{min}$ has elapsed since the last update. More specifically, $f_{min}$ may be maintained as a counter that is reset at each update. If $f_{min}$ has not elapsed, then state information is gathered from the Grid (Step 405).

Alternatively, when $f_{min}$ has elapsed, then the state information is used to identify the stress in the Grid (Step 409). Specifically, from the state information, the ability for the grid to process the jobs so as to comply with the maximum requested delay in the service level agreement is identified. More specifically, the difference between the actual delay and the maximum requested delay is identified for all of the jobs. The stress may be based on the difference whether positive or negative. Further, the stress may include various attributes, such as the difference between the maximum requested delay and an expected delay of the highest priority job in the job queue, an average of the difference between the maximum requested delay and the actual delay across all jobs, the minimum delay for any job, or any other indicator of stress.

Based on the stress in the grid and the current value function, the minimum offered delay is updated (Step 411). Specifically, if the stress in the system is outside of a threshold for the amount of stress (i.e., the stress is too high or too low), then the minimum offered delay is updated accordingly. Specifically, the amount of stress in the Grid is used in conjunction with the value function to determine whether the minimum offered delay should be updated.

Specifically, the state vector of the value function includes a least one stress-related state variable in accordance with one or more embodiments of the invention. In one or more embodiments of the invention, the value function may be calculated using fuzzy logic. Calculation of the value function using fuzzy logic may use the stress related state variable. By comparing the results of the value function calculation each attained by assuming various minimum offered delays, a determination may be made whether to update the minimum offered delay.

The minimum offered delay should be updated, for example, if the cost of the penalty to not comply with the maximum requested delay exceeds the amount attained from having a lower minimum offered delay. For example, if the stress in the system reveals that the actual delay or expected delay of ten percent of the jobs exceed the maximum requested delay and the value function reveals that it is more expensive to pay the penalty for not meeting the maximum requested delay than the value of executing the jobs, then the minimum offered delay may be set at a higher amount. Thus, a customer is no longer able to request a delay lower than the new minimum offered delay.

In another example, if fewer than one percent of the jobs exceed the maximum requested delay, then a lower minimum offered delay may result in a higher revenue. Specifically, in the example, even though some of the jobs may result in a penalty, the total revenue generated by jobs that are processed in a manner so as to comply with a lower minimum offered delay is more optimal. As shown in the example, the minimum offered delay may be maintained or set lower regardless of whether the actual delay (in the case of executing jobs) or expected delay (in the case of waiting jobs) of some jobs exceed the maximum requested delay.

In addition to or as an alternative to changing the minimum offered delay, the price of the minimum offered delay may be changed. Specifically, the shape of the price/delay function may be modified, such as through changing some of the parameters, in order for the price/delay function to pass through the minimum offered delay and the price of the minimum offered delay. For example, if the price/delay function corresponds to $P(t)=A*e^{-b*t}$, then A and/or b may be modified to pass through the new price of the minimum offered delay and/or the new minimum offered delay.

Continuing with FIG. 4, in addition to gathering state information from the Grid, information about the service level agreements and the revenue generated from the service level agreements is gathered (Step 413). Specifically, the system tracks the amount of revenue generated by the service level agreements, including any penalties paid, the number of service level agreements, the amount of the service level agreements, etc.

Next, a determination is made whether $f_{vf}$ has elapsed (Step 415). Specifically, a determination is made whether the timeframe or number of jobs defined by $f_{vf}$ has elapsed since the last update. More specifically, $f_{vf}$ may be maintained as a counter that is reset at each update. If $f_{vf}$ has not elapsed, then information about the service level agreements and revenue information is gathered (Step 415).

When $f_{vf}$ has elapsed, then the value function is adjusted using the information about the service level agreements and the revenue generated to create a revised value function (Step 417). Adjusting the value function may include, for example, reinforcement learning. Reinforcement learning is a process whereby changes are made and the outcome of the changes is observed. Based on the outcome, a determination is made whether to keep the changes. With regards to the value function, from an initial price/delay function (i.e., when the price/delay function is initialized or modified), the value function is used to estimate the revenue that should be generated in accordance with one or more embodiments of the invention. Specifically, the value function may use the minimum offered delay, the price of the minimum offered delay, and the state of the system to generate an estimated revenue.

After observing the actual revenue received from the last modification and the actual number of service level agreements received when the initial price/delay function is in effect, a determination may be made as to whether the value function is accurate. Determining whether the value function is accurate may involve using different forms of the expected revenue.

For example, in one form, the expected revenue corresponds to an amount of expected revenue to be generated over a specific time frame. By comparing an amount of expected revenue to be generated over a specific time frame with the actual revenue generated over the same time frame, a determination can be made whether the value function is accurate.

In another example, the expected revenue uses a discounted factor that is less than one. Summing the expected revenue over a unit of time multiplied by the discounted factor raised to a power produces an expected revenue in which future expected revenue is given decreasing weight on the expected revenue. For example, the expected revenue using the discounted factor may follow the form:

$$\text{Expected Revenue} = \sum_{i=0}^{\infty} (\text{expected revenue per unit time}) \cdot (\text{discount factor})^i$$

Using the expected revenue with the discounted factor, the actual revenue may be compared with the expected revenue to determine the accuracy of the value function.

If the value function is inaccurate, then reinforcement learning may be employed to correct the inaccuracy. Specifically, the rules may be adjusted, the weights may be adjusted, or state variables may be removed or added to the state vector. Making the revisions, may be performed with the goal of having an expected revenue using the revised value function match the actual revenue that is observed. Once the revised value function is deemed more accurate with past data, then the revised value function may be used to optimize the price/delay function. By modifying any of the above slightly and observing the results of the modification to determine whether a more accurate value function exists, a determination may be made whether to maintain the modifications.

Once the value function is adjusted to create the revised value function, then the price/delay function is updated using the revised value function (Step 419). Specifically, the value function may be used to determine whether the price/delay function should be a different curve. For example, if the price/delay function is of the form $P(t)=A*e^{-b*t}$, then the constants A and b may be changed to create a new value function. Another method is to use regression analysis to identify a new function that passes through various points on the price delay plane. This may result, for example, in the increase or decrease of all or some of the prices in relation to the delay.

When the new price/delay function is updated, then the revenue generated by the updated price/delay function is optimized. Specifically, the price/delay function may more accurately capture the prices that a consumer is willing to pay.

Figure 5:
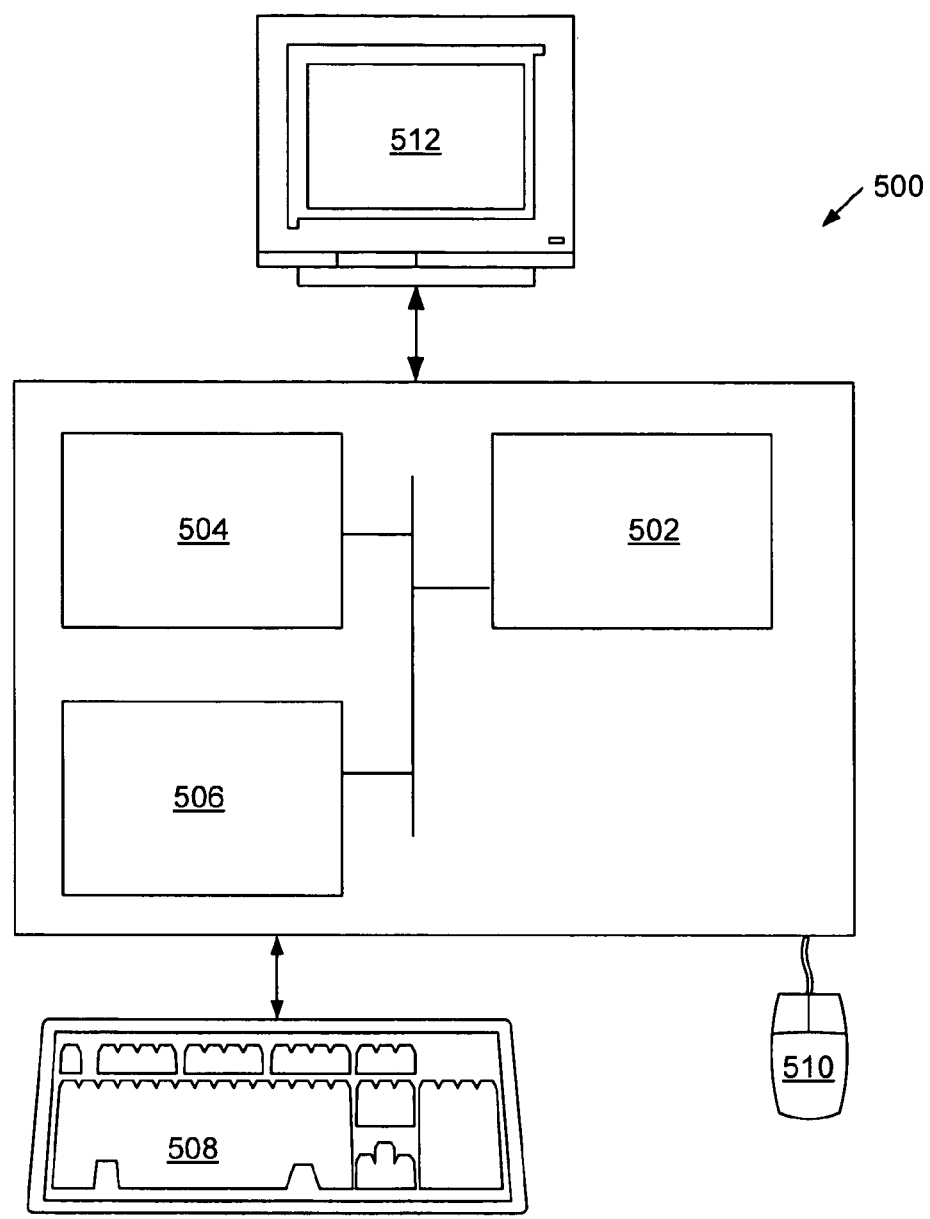
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., grid, job queue, scheduler, value function, price/delay function, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for increasing revenue generated from service level agreements (SLAs) comprising:
    obtaining, by a business entity managing a grid of computer processors, a continuous price/delay function mapping a domain of customer selectable delays to a range of prices,
        wherein each customer selectable delay in the domain corresponds to a maximum delay that a customer having a computing job agrees to wait before execution of the computing job is started on the grid,
        wherein the continuous price/delay function is continuous over the domain, and
        wherein the range comprises at least two different prices;
    designating, by the business entity, a first customer selectable delay of the domain as an initial minimum offered delay, wherein the initial minimum offered delay exceeds zero;
    offering, by the business entity to a first plurality of customers, a first subset of the domain exceeding the initial minimum offered delay;
    receiving, by the business entity and after offering the first subset, a first plurality of SLAs for executing a first plurality of computing jobs of the first plurality of customers, wherein the first plurality of SLAs specify a first plurality of delays selected from the first subset by the first plurality of customers;
    calculating, by a computer processor, a first expected revenue for the business entity from executing, on a the grid, the first plurality of computing jobs using a value function, a stress variable of the grid, a plurality of prices in the range of the price/delay function corresponding to the first plurality of delays, and the initial minimum offered delay, wherein the stress variable identifies a difference between the first customer selectable delay for at least one job and an expected delay for the at least one job, wherein the value function has a state vector as input, wherein the state vector specifies the state of the computer system, and wherein the value of the stress variable is a state variable in the state vector;
    designating, by the business entity, a second customer selectable delay of the domain as a new minimum offered delay, wherein the new minimum offered delay exceeds zero;
    calculating a second expected revenue for the business entity using the value function, the stress variable, and the new minimum offered delay;
    replacing the initial minimum offered delay on the continuous price/delay function with the new minimum offered delay in response to the second expected revenue exceeding the first expected revenue;
    offering, by the business entity, a second subset of the domain exceeding the new initial minimum offered delay to a second plurality of customers;
    receiving, by the business entity and after offering the second subset, a second plurality of SLAs for executing a second plurality of computing jobs of the second plurality of customers, wherein the second plurality of SLAs specify a second plurality of delays selected from the second subset by the second plurality of customers; and
    executing, on the grid, the second plurality of jobs associated with the second plurality of SLAs to generate revenue for the business entity.

2. The method of claim 1, wherein the continuous price/delay function is created using historical data.

3. The method of claim 1, wherein the shape of the continuous price/delay function is a convex decreasing curve.

4. The method of claim 1, further comprising:
    updating the state vector using reinforcement learning to create an updated state vector; and creating a new value function with the updated state vector.

5. The method of claim 4, further comprising:
    creating a new continuous price/delay function using the new value function.

6. The method of claim 1, wherein the continuous price/delay function is $P(t)=A*\exp(-b*t)$, wherein $P(t)$ is a price, A and b are constants, t is a customer selectable delay, and $\exp(\ )$ is the natural exponential function.

7. A system for increasing revenue generated from service level agreements (SLAs) comprising:
    a processor;
    a memory; and
    a plurality of instructions stored on the memory and executable by the processor to:
        obtain, for a business entity managing a grid of computer processors, a continuous price/delay function mapping a domain of customer selectable delays to a range of prices,
            wherein each customer selectable delay in the domain corresponds to a maximum delay that a customer having a computing job agrees to wait before execution of the computing job is started on the grid, wherein the continuous price/delay function is continuous over the domain, and wherein the range comprises at least two different prices;

designate, for the business entity, a first customer selectable delay of the domain as an initial minimum offered delay, wherein the initial minimum offered delay exceeds zero, offer, on behalf of the business entity to a first plurality of customers, a first subset of the domain exceeding the initial minimum offered delay;

receive, after the first subset is offered, a first plurality of SLAs for executing a first plurality of computing jobs of the first plurality of customers, wherein the first plurality of SLAs specify a first plurality of delays selected from the first subset by the first plurality of customers;

calculate a first expected revenue for the business entity from executing, on the grid, the first plurality of computing jobs using a value function, a stress variable of the grid, a plurality of prices in the range of the price/delay function corresponding to the first plurality of delays, and the initial minimum offered delay, wherein the stress variable identifies a difference between the first customer selectable delay for at least one job and an expected delay for the at least one job, wherein the value function has a state vector as input, wherein the state vector specifies the state of the grid computing system, and wherein the value of the stress variable is a state variable in the state vector;

designate, for the business entity, a second customer selectable delay of the domain as a new minimum offered delay, wherein the new minimum offered delay exceeds zero;

calculate a second expected revenue for the business entity using the value function, the stress variable, and the new minimum offered delay;

replace the initial minimum offered delay on the continuous price/delay function with the new minimum offered delay in response to the second expected revenue exceeding the first expected revenue; and offer, on behalf of the business entity, a second subset of the domain exceeding the new initial minimum offered delay to a second plurality of customers; and receive, after the second subset is offered, a second plurality of SLAs for executing a second plurality of computing jobs of the second plurality of customers, wherein the second plurality of SLAs specify a second plurality of delays selected from the second subset by the second plurality of customers, wherein the grid is configured to execute the second plurality of computing jobs associated with the second plurality of SLAs to generate revenue for the business entity.

8. The system of claim 7, wherein the continuous price/delay function is created using historical data.

9. The system of claim 7, wherein the shape of the continuous price/delay function is a convex decreasing curve.

10. The system of claim 7, the instructions further executable by the processor to:
update the state vector using reinforcement learning to create an updated state vector; and
create a new value function with the updated state vector.

11. The system of claim 10, the instructions further executable by the processor to:
create a new continuous price/delay function using the new value function.

12. The system of claim 7, wherein the continuous price/delay function is $P(t)=A*\exp(-b*t)$, wherein $P(t)$ is a price, A and b are constants, t is a customer selectable delay, and $\exp(\ )$ is the natural exponential function.

13. A non-transitory computer readable medium comprising instructions embodied therein for causing a computer system to:

obtain, for a business entity managing a grid of computer processors, a continuous price/delay function mapping a domain of customer selectable delays to a range of prices, wherein each customer selectable delay in the domain corresponds to a maximum delay that a customer having a computing job agrees to wait before execution of the computing job is started on the grid, wherein the continuous price/delay function is continuous over the domain, and wherein the range comprises at least two different prices;

designate, for the business entity, a first customer selectable delay of the domain as an initial minimum offered delay, wherein the initial minimum offered delay exceeds zero;

offer, on behalf of the business entity and to a first plurality of customers, a first subset of the domain exceeding the initial minimum offered delay receive, after the first subset is offered, a first plurality of SLAs for executing a first plurality of computing jobs of the first plurality of customers, wherein the first plurality of SLAs specify a first plurality of delays selected from the first subset by the first plurality of customers;

calculate a first expected revenue for the business entity from executing, on the grid, the first plurality of computing jobs using a value function, a stress variable of the grid, a plurality of prices in the range of the price/delay function corresponding to the first plurality of delays, and the initial minimum offered delay, wherein the stress variable identifies a difference between the first customer selectable delay for at least one job and an expected delay for the at least one job, wherein the value function has a state vector as input, wherein the state vector specifies the state of the computer system, and wherein the value of the stress variable is a state variable in the state vector;

designate, for the business entity, a second customer selectable delay of the domain as a new minimum offered delay, wherein the new minimum offered day exceeds zero;

calculate a second expected revenue for the business entity using the value function, the stress variable, and a new minimum offered delay;

replace the initial minimum offered delay on the continuous price/delay function with the new minimum offered delay in response to the second expected revenue exceeding the first expected revenue;

offer, on behalf of the business entity and to second plurality of customers, a second subset of the domain exceeding the new initial minimum offered delay;

receive, after the second subset is offered, a second plurality of SLAs for executing a second plurality of computing jobs of the second plurality of customers, wherein the second plurality of SLAs specify a second plurality of delays selected from the second subset by the second plurality of customers; and execute, on the grid, the second plurality of jobs associated with the second plurality of SLAs to generate revenue for the business entity.

14. The non-transitory computer readable medium of claim 13, wherein the continuous price/delay function is created using historical data, and wherein the shape of the continuous price/delay function is a convex decreasing curve.

15. The non-transitory computer readable medium of claim 13, wherein the instructions further cause the computer system to:
update the state vector using reinforcement learning to create an updated state vector;
create a new value function with the updated state vector; and
create a new continuous price/delay function using the new value function.

16. The non-transitory computer readable medium of claim 13, wherein the continuous price/delay function is $P(t)=A*\exp(-b*t)$, wherein $P(t)$ is a price, A and b are constants, t is a customer selectable delay, and exp( ) is the natural exponential function.

* * * * *